Patented Apr. 11, 1950

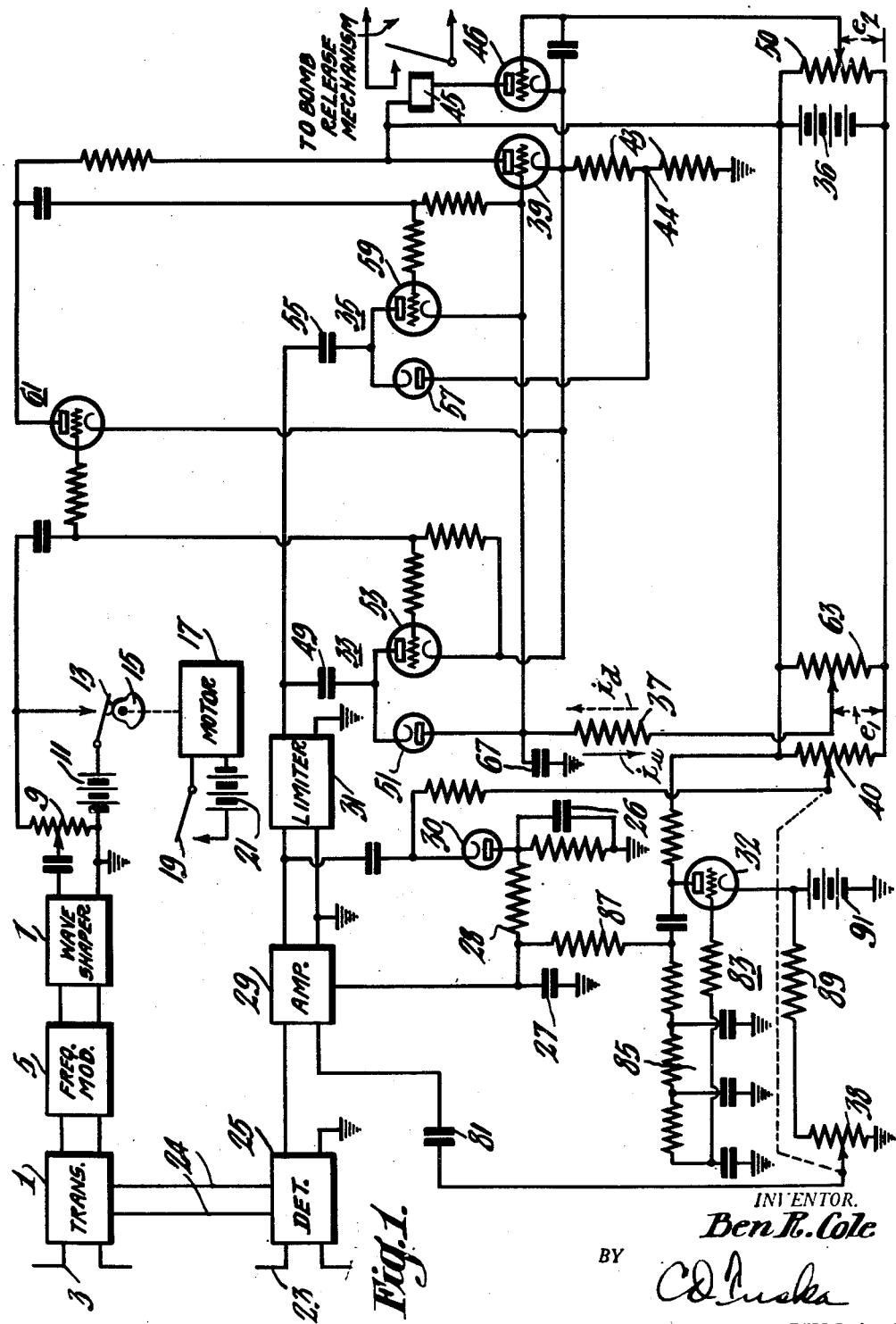

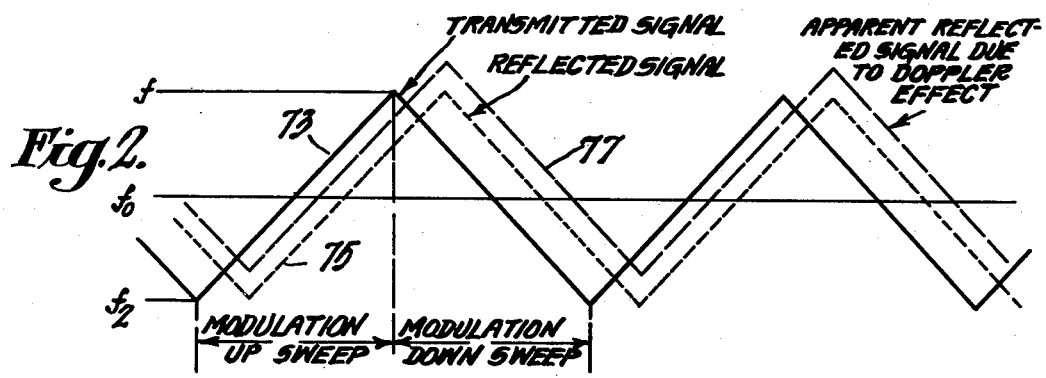
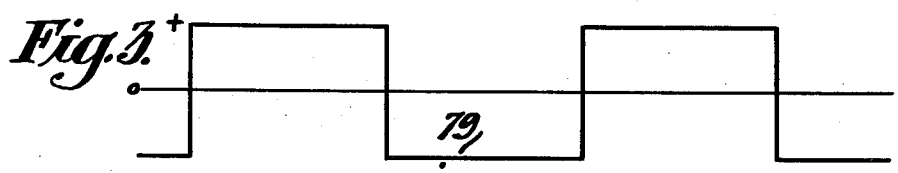
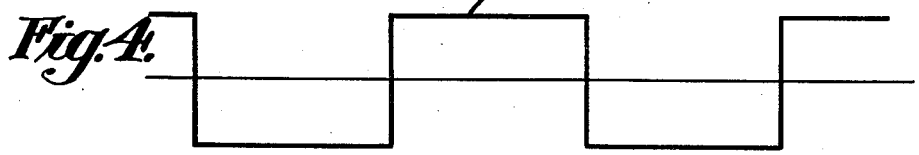
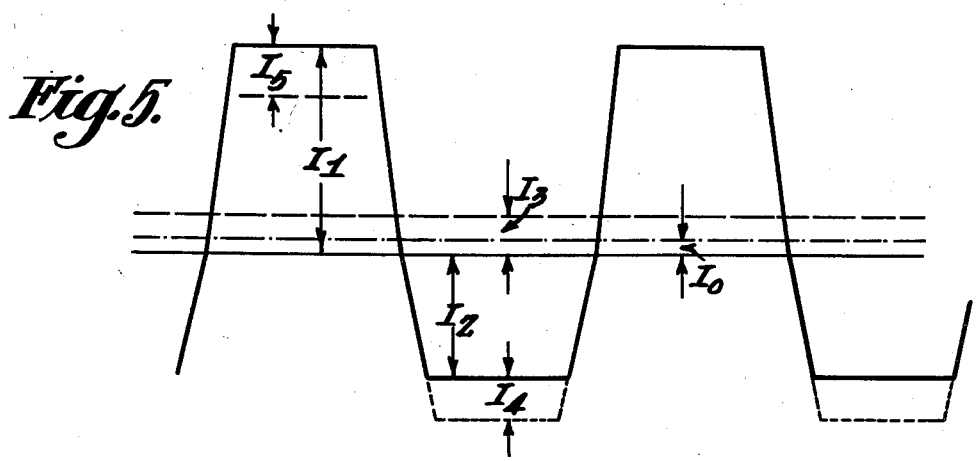
INVENTOR.
Ben R. Cole
BY
ATTORNEY

2,503,546

UNITED STATES PATENT OFFICE 2,503,546

RADIO SYSTEM

Ben R. Cole, Princeton, N. J., assignor to Radio Corporation of America, a corporation of Delaware Application October 19, 1945, Serial No. 623,366

3 Claims. (Cl. 343—7)

This invention relates to radio bomb release systems, and more particularly to improvements in systems of the type described in copending application Serial No. 524,794, filed on March 2, 1944, by Royden C. Sanders, Jr., and William R. Mercer, now Patent No. 2,412,632, issued December 17, 1946, and entitled Radio bomb release system, wherein a frequency modulated signal is radiated from a mobile craft toward a selected target, received after reflection from said target, and the received signal compared with the transmitted signal to actuate a bomb release device upon the occurrence of a predetermined relationship between the target distance and the speed with respect to the target.

Systems of the described type are sometimes subject to disturbances caused by severe fading of the received signals, as a result of multiple path transmission between the target and the bombing craft. Another effect which is almost invariably present in the operation of such systems is that of sea return, or reflection from the surface upon which the target lies. These two effects will, on occasion, conspire to cause premature release during pronounced fading conditions, since the so-called sea return will override the target signal, simulating a signal from a target at minimum range. A similar effect may also be produced by improper adjustment of the radio system.

It is the principal object of the present invention to provide a method of and means for preventing such premature releases. Another object is to provide a method of and means for causing the radio equipment to operate during fading conditions as if the target were at maximum range rather than minimum range, thus preventing release when no signal is being received from the target.

These and other objects will become apparent to those skilled in the art upon consideration of the following description with reference to the accompanying drawings of which Figure 1 is a schematic diagram of a bomb release system embodying the invention, Figure 2 is a graph illustrating variations in frequency of signals transmitted and received in the operation of the system of Figure 1, Figures 3 and 4 are graphs of square wave switching voltages occurring in the operation of Figure 1, and Figure 5 is a graph illustrating the switched counter output currents produced in the operation of the system of Figure 1.

Refer to Figure 1. A system of the type described in the above-mentioned Sanders et al. application is illustrated. A radio transmitter 1 is connected to an antenna 3 and to a frequency modulator 5. The modulator 5 may be of the vibratory variable capacitor type or any other known device for varying the frequency of the transmitter 1 in response to a modulating voltage. The input circuit of the modulator 5 is connected to a wave shaping circuit 7 which is connected through a voltage divider 9 to a battery 11 and a periodic switch 13. The switch 13 is arranged to be operated by a cam 15 driven by a motor 17. The motor 17 is connected through a switch 19 to a power source such as a battery 21.

A receiving antenna 23, similar in construction to the antenna 3, is connected to a detector 25. The transmitter 1 is also connected to the detector 25 through a line 24. Both antennas 3 and 23 are preferably directive, and are arranged to provide maximum response in the same direction.

The output circuit of the detector 25 is connected to an amplifier 29, which is provided with an A.-V.-C. circuit including a rectifier 30 connected to rectify a portion of the amplifier output, and a filter comprising capacitors 26 and 27 and a resistor 28, through which the rectified voltage is applied to a bias circuit of the amplifier in any known or conventional manner for controlling the amplifier gain. A D. C. source comprising a battery 36 and a voltage divider 40 is connected to the rectifier 30 and adjusted to bias it so that no rectification will occur with less than a predetermined output from the amplifier 29. The return terminal of the input circuit of the amplifier 29 is coupled through a capacitor 81 to the output circuit of an oscillator 83. The oscillator 83 comprises a tube 32 with its anode coupled to its cathode through a phase shifting network 85. The network 85 is designed to provide a shift of 180 degrees at some relatively high audio frequency, thus causing the tube 32 to tend to oscillate at said frequency.

One end of the network 85 is connected through a resistor 87 to the output circuit of the rectifier 30. The output circuit of the oscillator 83 includes an adjustable voltage divider 38 connected to the cathode of the tube 32 through a resistor 89. The cathode of the tube 32 is biassed positively with respect to ground potential by a D.-C. source 91. The voltage divider 38 may be mechanically ganged with the voltage divider 40, to vary the delay bias applied to the A.-V.-C. rectifier 30 in accordance with the amplitude of the oscillator output applied to the amplifier 29. This prevents the oscillator 83 from stopping itself by operating the rectifier 30.

The output circuit of the amplifier 29 is connected to an amplitude limiter 31. The output circuit of the limiter 31 is connected to a pair of averaging cycle counter circuits, generally designated by the reference numerals 33 and 35, respectively. The counters 33 and 35 are provided with a common load resistor 37, which is connected to the control grid of an amplifier tube 39. The anode of the tube 39 is connected directly to the D.-C. source 36. The cathode circuit of the tube 39 includes a resistor 43 tapped at a point 44. The cathode of the tube 39 is connected to the cathode of a tube 46. The control grid of the tube 46 is connected to a bias source comprising a voltage divider 50 connected across the battery 36. A relay 45 is included in the anode circuit of the tube 46.

The counter 33 includes a capacitor 49 connected to the cathode of a diode 51 and to the anode of a triode 53. The control grid of the triode 53 is coupled to the switch 13. The cathode of the tube 53 is connected to the cathode of the tube 39. The anode of the diode 51 is connected to the load resistor 37. The counter 35 comprises a capacitor 55 connected to the cathode of a diode 57 and to the anode of a triode 59. The control grid of the triode 59 is coupled through a phase inverter circuit 61 to the switch 13. The anode of the diode 57 is connected to the cathode circuit of the tube 39 at the point 44. The cathode of the triode 59 is connected to the control grid of the tube 39 and the upper end of the resistor 37. The lower end of the resistor 37 is connected to a voltage divider 63 across the battery 36. The load resistor 37 is bypassed to ground by a capacitor 67.

The operation of the system thus far described is as follows: The motor 17 operates the switch 13 by means of the cam 15 to connect the battery 11 periodically to the voltage divider 9, thus producing a square wave voltage variation of the voltage across the voltage divider 9. The square wave voltage is attenuated to an extent depending upon the position of the adjustable tap of the voltage divider 9, and is applied to the wave shaping circuit 7. The wave shaping circuit 7 includes a low pass filter or other means for integrating the square wave input with respect to time to produce an output of triangular wave shape. The triangular wave output of the wave shaping circuit 7 is applied to the modulator 5 causing corresponding triangular wave variation of the frequency of operation of the transmitter 1. The frequency modulated signal produced by the transmitter 1 is radiated by the antenna 3 to the target, not shown. Part of the energy striking the target is reflected to the receiving antenna 23.

The received reflected signal is combined in the detector 25 with some of the original frequency modulated signal, which is conducted directly from the transmitter 1 to the detector 25 through the line 4. The output of the detector 25 includes a beat signal having a frequency equal to the difference between the instantaneous frequency of the transmitted and received signals. The beat output of the detector 25 is amplified by the amplifier 29 and limited to a constant amplitude by the limiter 31. The output of the limiter 31 is a square wave voltage having a frequency equal to the difference between the frequency of the transmitted and received signals and a constant amplitude, $E_s$.

Referring to Figure 2, the frequency of the transmitted signal is represented by the solid line 73. This frequency varies throughout the modulation cycle in response to the triangular wave output of the wave shaping circuit 7, between upper and lower limits $f_2$ and $f_1$, respectively, about a mean value $f_0$. The sweep width $f_2-f_1$ is proportional to the amplitude of the triangular wave input to the modulator 5, and hence is a function of the position of the adjustable contact of the voltage divider 9.

The reflected signal is delayed with respect to the transmitted signal by the time required for the radiation to travel from the transmitting antenna 3 to the target, and back to the receiving antenna 23. This is indicated by the dotted line 75 in Figure 2. Assuming the distance to the target to be constant, the reflected signal varies in frequency over the same range $f_2-f_1$ as the transmitted signal, but constantly differs in frequency from the transmitted signal by an amount proportional to the distance. The difference in frequency is $$\frac{Sf_m d}{246}$$

cycles per second, where $S=f_2-f_1$ in megacycles per second, $f_m$ is the modulation frequency in cycles per second, or frequency of operation of the switch 13, and $d$ is the distance in feet. If the equipment is moving toward the target, the received signal is increased in frequency, owing to Doppler effect, by an amount $$\frac{2vf_0}{C}$$

where $v$ is the velocity in feet per second, $f_0$ is the carrier frequency in cycles per second and C is the velocity of radiation propagation in feet per second. The frequency of the received signal is represented by the dash line 77 in Figure 2. This frequency varies throughout the modulation cycle over a frequency band which is equal in width to that of the transmitted signal. The difference in frequency between the transmitted and the received signal is $$f_u=\frac{Sf_m d}{246}-\frac{2vf_0}{C}$$

cycles per second during increase in frequency of the transmitted signal, and $$f_d=\frac{Sf_m d}{246}+\frac{2vf_0}{c}$$

cycles per second during decrease in frequency of the transmitted signal.

The constant amplitude beat frequency output of the limiter 31 is applied to both of the counters 33 and 35. The connections to the modulator 5 are such that during the modulation downsweep, or decrease in frequency of the transmitted signal, the switch 13 is closed, applying a positive pulse to the control grid of the triode 53 and to the phase inverter 61, as indicated by the graph of Figure 3. The phase inverter 61 provides a negative pulse which is applied to the control grid of the triode 59 of the counter 35, as indicated by the graph of Figure 4. The triode 59 is thereby cut off, and the counter 35 prevented from operating. During negative half cycles of the limiter output, the capacitor 49 is charged through the diode 51 and the resistor 37. The values of the capacitor 49 and resistor 37 are such that the capacitor 49 becomes substantially fully charged to the limiter output voltage $E_s$ during each cycle of the limiter output. During positive half cycles, the capacitor 49 is discharged through the triode 53 to the potential existing at the cathode of the tube 39, which is substantially equal to that at the anode of the diode 51. Thus during the modulation downsweep, the counter 33 causes an average current $i_d$ to flow upward through the resistor 37 as indicated by the dash arrow. This current is proportional to the product of the charge deposited in the capacitor 49 during each cycle, and the number of cycles per second:

$$i_d = f_r Q = f_r C_2 E_s$$

where $C_2$ is the capacitance of the capacitor 49. Since $$f_d = \frac{S f_m d}{246} + \frac{2 v f_0}{C}$$

$$i_d = \frac{S f_m d}{246} C_2 E_s + \frac{2 v f_0}{C} C_2 E_s$$

During the modulation upsweep, the switch 13 is open, providing a negative pulse at the grid of the triode 53 and the phase inverter 61, and a positive pulse at the grid of the triode 59, as indicated by the portions 79 and 81, respectively, of the graphs of Figures 3 and 4. The counter 33 is now inoperative and the counter 35 operates. The triode 59 is conductive, allowing the capacitor 55 to charge through the resistor 37 during positive half cycles of the output of the limiter 31. During negative half cycles of the limiter output, the capacitor 55 is discharged through the diode 57 to the potential appearing at the tap 44 on the resistor 43, which is slightly less than the potential at the cathode of the tube 39 and hence that of the cathode of the tube 53. Thus during the modulation upsweep, the counter 33 causes a current $i_u$ to flow downward through the resistor 37, as indicated by the solid arrow. This current is proportional to the product of the charge deposited in the capacitor 55 during each cycle, and the number of cycles per second:

$$i_u = f_\mu Q = f_u C_1 E_s$$

where $f_u$ is the beat frequency, Q is the charge per cycle, $C_1$ is the capacitance of the capacitor 55, and $E_s$ is the amplitude of the output of the limiter 31. Since $$f_u = \frac{S f_m d}{246} - \frac{2 v f_0}{C}$$

$$i_u = \frac{S f_m d}{246} C_1 E_s - \frac{2 v f_0}{C} C_1 E_s$$

The average current through the resistor 37 is $$i_0 = i_u - i_d$$

$$i_0 = \frac{S f_m d}{246} E_s (C_1 - C_2) - \frac{2 v f_0}{C} E_s (C_1 - C_2)$$

Refer to Figure 5, wherein $I_1$ is the average component of current during upsweep due to distance, $I_2$ is the average component of current during downsweep due to distance, $I_3$ is the resultant average component of current due to distance, $I_4$ is the increase in negative average component of current during downsweep due to speed, and $I_5$ is the decrease in positive average current during upsweep due to speed. The resultant average voltage across the resistor 37 is $$e_0 = i_0 R$$

where R is the resistance of the resistor 37.
The tap of the voltage divider 63 is adjusted to apply a positive potential of, for example, approximately 70 volts to the lower end of the resistor 37. The purpose of this arrangement is to provide a suitable operating point for the cathode follower tube 39. Denoting this voltage as $e_1$, the total voltage at the control grid of the tube 39 referred to ground potential, is $e_0 + e_1$. Inasmuch as the entire load of the tube 39 is in the cathode circuit, the anode current will assume a value such that the drop in said load circuit is very slightly greater than the voltage between the control grid and ground, and as a practical matter, substantially equal to the grid voltage.

This is the case only so long as the tube 46 is non-conductive. The voltage divider 50 is adjusted to apply a positive voltage $e_2$ to the control grid of the tube 46. Since the cathode is also positive, at a voltage substantially equal to $E_0 + e_1$, the tube 46 will be cut off as long as $e_0 + e_1$ exceeds $e_2$ by more than a predetermined voltage which depends upon the design of the tube 46 and the anode voltage supplied thereto by the battery 36. The voltage $e_2$ is adjusted in accordance with the altitude at which a bombing run is to be made, as described in detail in the above-mentioned Sanders et al. application.

Assume that the bombing craft is travelling toward the target at a substantially constant velocity $v$. Initially, the distance $d$ is relatively great, and hence $i_0$ is relatively large. The voltage $e_0$ is therefore of maximum value, and $e_0 + e_1$ greatly exceeds $e_2$. As the target is approached, $e_0$ gradually decreases, while $e_1$ and $e_2$ remain constant. At a predetermined time T before the bomber is directly over the target, $e_0$ falls to a value low enough so that the tube 46 will conduct, energizing the relay 45 to actuate the bomb release mechanism. The voltage dividers 9, 50 and 63 are adjusted as described in the above-mentioned Sanders et al. application to make the time T equal to that of that required for a bomb to fall from the altitude $h$ at which the bombing run is to be made.

Under ideal conditions, the above-described operation will cause release to occur at the proper instant to score a hit upon the selected target. Ordinarily the signal reflected by the target is stronger than that reflected by the surface upon which the target is lying, so that the voltage $e_0$ is a function of substantially only the target distance and the speed of the bomber with respect to that of the target. However, if the target signal fades, the apparatus will respond to surface reflections. These reflections may simulate a signal from a target directly under the bomber or that from a target at a distance which is much less than the distance of the actual target. Accordingly, the voltage $e_0$ will decrease, and may decrease to such an extent that the tube 46 is allowed to conduct, actuating the relay 45 and causing release of a bomb.

This difficulty, although caused by fading, is not remedied by the A.-V.-C. device, which merely tends to maintain the general signal level, with no discrimination between target reflection and surface reflection.

In accordance with the present invention, the bias provided to the tube 32 by the source 91 is adjusted so that with a normally large target signal, the additional bias supplied by the A.-V.-C. rectifier 30 is sufficient to prevent the tube 32 from oscillating. When the received signal falls below a predetermined amplitude, the rectifier 30 is cut off by the delay bias derived from the voltage divider 40, reducing the negative bias on the grid of the tube 32, allowing it to oscillate.

As mentioned above, the oscillator 83 is designed to operate at a relatively high audio frequency. Its output, applied to the amplifier 29, simulates a beat signal such as would appear from a relatively distant target. The amplitude of the oscillator signal applied to the amplifier 29 is adjusted by means of the voltage divider 88 to a value such that any target signal of useful amplitude will override it, operating the A.-V.-C. rectifier 30 and again cutting off the oscillator 83. Thus so long as the received signal is lower than a predetermined amplitude, the counters 33 and 35 produce a voltage e₀ corresponding to a remote target, and the tube 46 is prevented from conducting.

If the target signal returns before the bomber reaches the target, the rectifier 30 starts to operate again, cutting off the tube 32 and allowing the differential counters 33 and 35 to operate in normal fashion, causing a normal release to occur. While the above description refers to a specific system, the invention is not limited thereto. For example, it has been found that under some circumstances, it is not necessary to employ switched differential counters, or other speed-responsive means, because the proper range for release is substantially independent of the speed. Thus a simple range-responsive system may be used, similar to one of the counters 33 and 35 but operating continuously. This arrangement will tend to provide a false release upon failure of the target signal, and may be prevented from doing so by the generation of a simulated distance signal, corresponding to a range greater than the maximum possible release range.

Thus the invention has been described as an improved radio bomb release system, including means for preventing false release upon failure of the target reflection signal by simulating response to a target at a great distance. In the described system, this is accomplished by means of an oscillator connected to respond to the automatic volume control rectifier to provide a simulated distance signal when the received signal level falls below a predetermined amplitude.

I claim as my invention:

1. In a frequency modulation radio reflection system of the type including a radio transmitter, a source of modulating signal, means responsive to said modulating signal to vary cyclically the frequency of the output of said transmitter, means for radiating said output to a selected target, means for receiving said signal after reflection by said target and for combining said reflected signal with said transmitter output to produce a beat signal, and means responsive to said beat signal to initiate release of a bomb upon the attainment of a predetermined relationship between the average frequency of said beat signal and the range of variation in frequency of said beat signal, means for preventing false operation of said system comprising a local oscillator tuned to a frequency corresponding to the average beat frequency which would be produced in response to signal reflection from a distant target, means for normally providing a bias to said oscillator to prevent operation thereof, and means responsive to the amplitude of said beat signal to overcome said bias in response to decrease of said amplitude below a predetermined level.

2. In a frequency modulation radio reflection system of the type including a radio transmitter, a source of modulating signal, means responsive to said modulating signal to vary cyclically the frequency of the output of said transmitter, means for radiating said output to a selected target, means for receiving said signal after reflection by said target and for combining said reflected signal with said transmitter output to produce a beat signal, and means responsive to said beat signal to initiate release of a bomb upon the attainment of a predetermined frequency of said beat signal, means for preventing false operation of said system comprising a local oscillator tuned to a frequency corresponding to the beat frequency which would be produced in response to signal reflection from a distant target, means for normally providing a bias to said oscillator to prevent operation thereof, and means responsive to the amplitude of said beat signal to overcome said bias in response to decrease of said amplitude below a predetermined level.

3. In a radio bomb release system of the frequency modulation reflection type including a transmitter, a receiver, and beat frequency responsive means for effecting release upon the attainment of a predetermined relationship between the range and speed of a target, means for preventing false operation of said system comprising an automatic volume control circuit connected to said receiver, an oscillator connected to said receiver and adjusted to provide an output simulating a beat signal correspond to a distant target, means for normally preventing operation of said oscillator, and means responsive to the output of said automatic volume control circuit to overcome said last-mentioned means and thus cause operation of said oscillator during signal fading periods.

BEN R. COLE.

REFERENCES CITED

The following references are of record in the file of this patent:

UNITED STATES PATENTS

| Number | Name | Date |
|---|---|---|
| 2,161,081 | Ovtschinnikoff | June 6, 1939 |
| 2,194,141 | Estoppey | Mar. 18, 1940 |
| 2,206,019 | Higgins | July 1, 1940 |
| 2,264,019 | Case | Nov. 25, 1941 |
| 2,299,313 | Durgin | Oct. 20, 1942 |
| 2,416,223 | Sanders | Feb. 18, 1947 |
| 2,444,678 | Sanders | July 6, 1948 |